United States Patent
Hoffman et al.

(10) Patent No.: US 9,058,408 B2
(45) Date of Patent: *Jun. 16, 2015

(54) SYSTEM AND METHOD OF CONTROLLING INTERACTIVE COMMUNICATION SERVICES BY RESPONDING TO USER QUERY WITH RELEVANT INFORMATION FROM CONTENT SPECIFIC DATABASE

(71) Applicant: Eye Level Holdings, LLC, Scottsdale, AZ (US)

(72) Inventors: Geoffrey D. Hoffman, Tempe, AZ (US); Bradley R. Owen, Mesa, AZ (US); Jason R. Hope, Scottsdale, AZ (US)

(73) Assignee: Eye Level Holdings, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/846,297

(22) Filed: Mar. 18, 2013

(65) Prior Publication Data

US 2013/0212091 A1    Aug. 15, 2013

Related U.S. Application Data

(63) Continuation of application No. 12/766,720, filed on Apr. 23, 2010, now Pat. No. 8,452,765.

(51) Int. Cl.
*G06F 17/30* (2006.01)
*H04W 4/12* (2009.01)
(Continued)

(52) U.S. Cl.
CPC .... *G06F 17/30991* (2013.01); *G06F 17/30867* (2013.01); *G06F 17/30905* (2013.01);
(Continued)

(58) Field of Classification Search
CPC ............. G06F 17/30867; G06F 17/30905; G06F 17/30991; G06F 17/30864; H04W 4/12; G06Q 10/10; G06Q 30/02; H04L 67/16
USPC .................................... 707/728, 705
See application file for complete search history.

(56) References Cited

U.S. PATENT DOCUMENTS 4,774,655 A    9/1988  Kollin et al.
5,206,949 A *  4/1993  Cochran et al. ............... 707/752
(Continued)

OTHER PUBLICATIONS

Berenci et al., "Effectiveness of Keyword-Based Display and Selection of Retrieval Results for Interactive Searches", ECDL '99, LNCS 1696, pp. 106-125, 1999.*
(Continued)

*Primary Examiner* — Phuong Thao Cao
(74) *Attorney, Agent, or Firm* — Robert D. Atkins; Patent Law Group: Atkins and Associates, P.C.

(57) ABSTRACT

An electronic communication system is controlled by a content service provider to return relevant information from a content specific database in response to a user query. The content service provider compiles a plurality of content specific databases, each dedicated to a category of information of interest to the user. The user registers a user profile with the content service provider. A query, including the selected content specific database, is transmitted from the user to the content service provider. The selected content specific database is searched for the first level query within context of the user profile. A menu of matches is generated from the content specific database for the first level query. The menu is organized by relevance scores assigned to the matches based on correspondence to the first level query. The menu is transmitted from the content service provider through the electronic communication network to the user.

20 Claims, 8 Drawing Sheets

(51) Int. Cl.
　　　*G06Q 10/10* (2012.01)
　　　*G06Q 30/02* (2012.01)
　　　*H04L 29/08* (2006.01)

(52) U.S. Cl.
　　　CPC ........... *H04W4/12* (2013.01); *G06F 17/30864* (2013.01); *G06Q 10/10* (2013.01); *G06Q 30/02* (2013.01); *H04L 67/16* (2013.01)

(56) References Cited

U.S. PATENT DOCUMENTS

| | | | |
|---|---|---|---|
| 5,758,332 A * | 5/1998 | Hirotani | 1/1 |
| 5,832,497 A | 11/1998 | Taylor | |
| 5,878,423 A | 3/1999 | Anderson et al. | |
| 5,924,090 A | 7/1999 | Krellenstein | |
| 5,930,791 A * | 7/1999 | Leu | 1/1 |
| 6,401,087 B2 | 6/2002 | Yanagimoto | |
| 6,484,166 B1 | 11/2002 | Maynard | |
| 6,760,720 B1 * | 7/2004 | De Bellis | 707/706 |
| 6,766,315 B1 | 7/2004 | Bratsos et al. | |
| 6,766,363 B1 | 7/2004 | Rothschild | |
| 6,785,671 B1 | 8/2004 | Bailey et al. | |
| 6,963,867 B2 | 11/2005 | Ford et al. | |
| 7,096,218 B2 * | 8/2006 | Schirmer et al. | 707/767 |
| 7,177,818 B2 * | 2/2007 | Nair | 705/346 |
| 7,574,432 B1 * | 8/2009 | De Bellis | 1/1 |
| 7,689,546 B2 * | 3/2010 | Miller et al. | 707/999.003 |
| 7,711,738 B1 | 5/2010 | Kraft et al. | |
| 7,747,600 B2 | 6/2010 | Svore et al. | |
| 7,761,293 B2 | 7/2010 | Tran | |
| 7,801,885 B1 | 9/2010 | Verma | |
| 7,809,708 B2 * | 10/2010 | Aridor et al. | 707/706 |
| 7,840,589 B1 * | 11/2010 | Holt et al. | 707/769 |
| 7,849,096 B2 * | 12/2010 | Fein et al. | 707/765 |
| 7,917,528 B1 * | 3/2011 | Dave et al. | 707/766 |
| 8,108,416 B2 | 1/2012 | Marlow | |
| 8,108,892 B1 * | 1/2012 | Durkee et al. | 725/34 |
| 8,126,863 B2 * | 2/2012 | Williams et al. | 707/705 |
| 8,190,602 B1 | 5/2012 | James | |
| 8,275,786 B1 * | 9/2012 | Dave et al. | 707/766 |
| 8,694,526 B2 * | 4/2014 | Costello et al. | 707/765 |
| 2001/0051876 A1 | 12/2001 | Seigel et al. | |
| 2002/0046209 A1 * | 4/2002 | De Bellis | 707/10 |
| 2002/0065758 A1 * | 5/2002 | Henley | 705/37 |
| 2002/0069312 A1 | 6/2002 | Jones | |
| 2002/0082958 A1 * | 6/2002 | Cooley et al. | 705/29 |
| 2002/0099685 A1 | 7/2002 | Takano et al. | |
| 2002/0119793 A1 * | 8/2002 | Hronek et al. | 455/466 |
| 2002/0143521 A1 * | 10/2002 | Call | 704/1 |
| 2003/0050914 A1 * | 3/2003 | Bachman et al. | 707/1 |
| 2003/0061203 A1 * | 3/2003 | Hayduk, Jr. | 707/3 |
| 2003/0069693 A1 | 4/2003 | Snapp et al. | |
| 2003/0105873 A1 * | 6/2003 | Ye et al. | 709/230 |
| 2003/0195868 A1 * | 10/2003 | Wilson et al. | 707/3 |
| 2003/0195877 A1 * | 10/2003 | Ford et al. | 707/3 |
| 2004/0128193 A1 | 7/2004 | Brice et al. | |
| 2004/0267774 A1 * | 12/2004 | Lin et al. | 707/100 |
| 2005/0004889 A1 | 1/2005 | Bailey et al. | |
| 2005/0010605 A1 | 1/2005 | Conrad et al. | |
| 2005/0120084 A1 * | 6/2005 | Hu et al. | 709/206 |
| 2005/0160082 A1 | 7/2005 | Dawson | |
| 2005/0234771 A1 * | 10/2005 | Register et al. | 705/14 |
| 2005/0278633 A1 | 12/2005 | Kemp | |
| 2006/0069664 A1 * | 3/2006 | Ling et al. | 707/1 |
| 2006/0069998 A1 | 3/2006 | Artman et al. | |
| 2006/0074891 A1 * | 4/2006 | Chandrasekar et al. | 707/3 |
| 2006/0149721 A1 | 7/2006 | Langford | |
| 2006/0167864 A1 | 7/2006 | Bailey et al. | |
| 2006/0190806 A1 * | 8/2006 | Sasson et al. | 715/500 |
| 2006/0248078 A1 * | 11/2006 | Gross et al. | 707/5 |
| 2006/0259547 A1 | 11/2006 | Bogatin et al. | |
| 2006/0293065 A1 | 12/2006 | Chew et al. | |
| 2007/0143309 A1 * | 6/2007 | Malik | 707/100 |
| 2007/0192314 A1 | 8/2007 | Heggem | |
| 2007/0198500 A1 * | 8/2007 | Lucovsky et al. | 707/4 |
| 2007/0207821 A1 * | 9/2007 | Tran | 455/466 |
| 2007/0214123 A1 * | 9/2007 | Messer et al. | 707/3 |
| 2007/0233806 A1 * | 10/2007 | Asadi | 709/217 |
| 2007/0288439 A1 * | 12/2007 | Rappaport et al. | 707/3 |
| 2007/0298819 A1 * | 12/2007 | Hronek et al. | 455/466 |
| 2008/0062127 A1 * | 3/2008 | Brodersen et al. | 345/158 |
| 2008/0065612 A1 * | 3/2008 | De Bellis | 707/3 |
| 2008/0070558 A1 * | 3/2008 | Lovell | 455/414.1 |
| 2008/0195456 A1 * | 8/2008 | Fitzpatrick et al. | 705/9 |
| 2008/0275864 A1 * | 11/2008 | Kim et al. | 707/5 |
| 2008/0281800 A1 | 11/2008 | Bengtsson | |
| 2008/0319952 A1 | 12/2008 | Carpenter et al. | |
| 2009/0005123 A1 | 1/2009 | Lessing | |
| 2009/0055354 A1 | 2/2009 | Arad | |
| 2009/0063959 A1 * | 3/2009 | Stejic | 715/255 |
| 2009/0089687 A1 | 4/2009 | Lecomte et al. | |
| 2009/0089838 A1 | 4/2009 | Pino, Jr. et al. | |
| 2009/0112816 A1 | 4/2009 | Marlow | |
| 2009/0112848 A1 | 4/2009 | Kunjithapatham et al. | |
| 2009/0119263 A1 | 5/2009 | Jones et al. | |
| 2009/0144260 A1 * | 6/2009 | Bennett et al. | 707/5 |
| 2009/0157523 A1 | 6/2009 | Jones et al. | |
| 2009/0181614 A1 | 7/2009 | Wolff et al. | |
| 2009/0240672 A1 * | 9/2009 | Costello | 707/4 |
| 2009/0249248 A1 * | 10/2009 | Burckart et al. | 715/810 |
| 2009/0282022 A1 | 11/2009 | Bennett | |
| 2009/0286560 A1 * | 11/2009 | Willis | 455/466 |
| 2009/0287683 A1 | 11/2009 | Bennett | |
| 2009/0307018 A1 * | 12/2009 | Chappell et al. | 705/5 |
| 2010/0036830 A1 * | 2/2010 | Lee | 707/5 |
| 2010/0055772 A1 | 3/2010 | Nagai et al. | |
| 2010/0057728 A1 * | 3/2010 | Quick et al. | 707/5 |
| 2010/0082610 A1 | 4/2010 | Anick et al. | |
| 2010/0094878 A1 | 4/2010 | Soroca et al. | |
| 2010/0153572 A1 | 6/2010 | Feig et al. | |
| 2010/0168996 A1 | 7/2010 | Bourque et al. | |
| 2010/0235791 A1 * | 9/2010 | Chee et al. | 715/825 |
| 2011/0055005 A1 | 3/2011 | Lang | |
| 2011/0238662 A1 * | 9/2011 | Shuster et al. | 707/728 |
| 2011/0250570 A1 | 10/2011 | Mack | |
| 2011/0286628 A1 * | 11/2011 | Goncalves et al. | 382/103 |
| 2013/0024901 A1 | 1/2013 | Sharif-Ahmadi et al. | |

OTHER PUBLICATIONS

Amazon Website, 2013, 3 pages, accessed online at <http://www.amazon.com> Feb. 8, 2013.

Dumais et al., "Iterative Searching in an Online Database", in the proceedings of the Human Factors Society 35th Annual Meeting (pp. 398-402), 1991, 13 pages.

* cited by examiner

SYSTEM AND METHOD OF CONTROLLING INTERACTIVE COMMUNICATION SERVICES BY RESPONDING TO USER QUERY WITH RELEVANT INFORMATION FROM CONTENT SPECIFIC DATABASE

CLAIM TO DOMESTIC PRIORITY

The present application is a continuation of U.S. patent application Ser. No. 12/766,720, now U.S. Pat. No. 8,452,765, filed Apr. 23, 2010, which application is incorporated herein by reference.

FIELD OF THE INVENTION

The present invention relates in general to electronic communication systems and, more particularly, to a system and method of controlling interactive communication services organized to efficiently and systematically respond to user queries with relevant information from content specific databases.

BACKGROUND OF THE INVENTION

People use electronic communications in virtually every phase of business and personal activities. The electronic communication is conducted with telecommunication devices, e.g., computers and cellular telephones, through the Internet and associated wired and wireless communication channels and pathways. For example, electronic communication may involve sending and receiving email or text messages. While electronic communications makes the transfer of information relatively fast and easy, finding specific information of interest can still be a challenging and time-consuming process.

Consider a computer or cellular telephone user seeking information on a specific topic of interest. The user can conduct an Internet search using a web browser and search engine, e.g., Google, Bing, or Yahoo. Most search engines maintain overviews of most, if not all, publically available Internet websites on their servers. The search engine conducts a search of its servers and returns matches or partial matches to a user query. The search results are displayed as a list of websites, with potentially hundreds or thousands of hits, each with a portion of the relevant text from the website matching the user query. The search engine servers typically do not contain a complete copy of the myriad of Internet websites due to the large volume of information. The user can select one website from the list and be directed by that specific website for further information. The user must then review the content of the selected website to find the information being sought.

As most users have experienced, it may be necessary to review many different websites from the search engine listing to find the specific information of interest. Each Internet website is laid-out and organized by an administrator of the website to convey information according to purposes or business plan of the sponsoring company or organization. The website is organized for the purpose of presenting information that the sponsor is intending to convey and typically does not attempt to integrate or correlate information from other websites. The website may not be organized in a manner which is conducive or optimized to resolve the user's query. If the first website selected from the search engine list does not yield the information of interest, the user returns to the search engine listing and picks another website. The process of reviewing individual websites continues until the user is satisfied or gives up.

The logistics of finding information from mainstream Internet websites on a cellular telephone is particularly difficult due to the limited viewing area, small font and images, and manual dexterity needed to navigate what is typically formatted to be a large information space using a compact user interface. The information is difficult to see and requires substantial horizontal and vertical scrolling to comprehend the total website content. Web-based searching and information retrieval by cellular telephone is still in its infancy.

SUMMARY OF THE INVENTION

A need exists to provide interactive communication services organized to efficiently and systematically respond to user queries with relevant information. Accordingly, in one embodiment, the present invention is a method of controlling access to a plurality of content specific databases through an electronic communication network comprising the steps of compiling a plurality of content specific databases by a content service provider with each content specific database dedicated to a category of information of interest to a user, transmitting a first level query from the user through the electronic communication network to the content service provider, searching one or more of the content specific databases for the first level query, generating a first menu of matches from the content specific database for the first level query, and transmitting the first menu from the content service provider through the electronic communication network to the user.

In another embodiment, the present invention is a method of controlling access to a plurality of content specific databases through an electronic communication network comprising the steps of compiling a plurality of content specific databases by a content service provider, transmitting a first level query from a user through the electronic communication network to the content service provider, searching one or more the content specific databases for the first level query, generating a first menu of matches from the content specific database for the first level query, and transmitting the first menu from the content service provider through the electronic communication network to the user.

In another embodiment, the present invention is a method of controlling access to a content specific database through an electronic communication network comprising the steps of transmitting a first level query from a user through the electronic communication network to a content service provider, selecting a content specific database, searching the selected content specific database for the first level query, generating a first menu of matches from the content specific database for the first level query, and transmitting the first menu from the content service provider through the electronic communication network to the user.

In another embodiment, the present invention is a computer program product, comprising computer readable program code embodied in a computer usable medium to implement a method for controlling access to a plurality of content specific databases through an electronic communication network comprising the steps of transmitting a first level query from a user through the electronic communication network to a content service provider, selecting a content specific database, searching the selected content specific database for the first level query, generating a first menu of matches from the content specific database for the first level query, and transmitting the first menu from the content service provider through the electronic communication network to the user.

DETAILED DESCRIPTION OF THE DRAWINGS

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the scope of the invention as defined by the appended claims and their equivalents as supported by the following disclosure and drawings.

Figure 1:
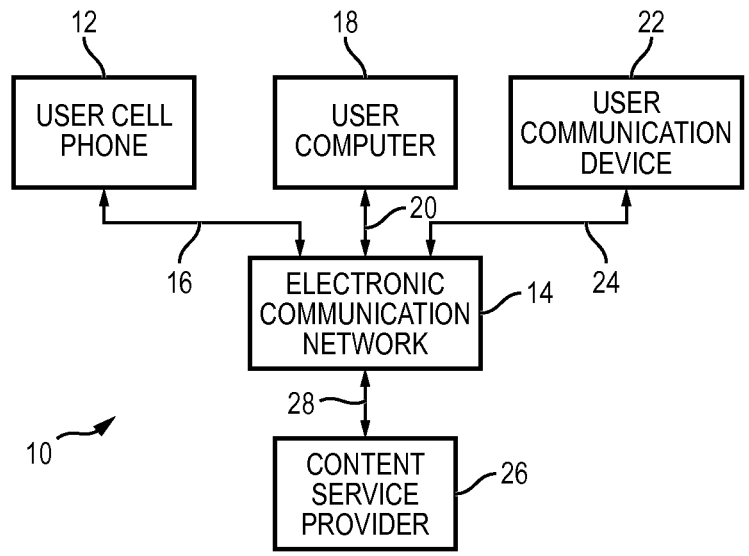
FIG. 1 is a block diagram of an electronic communication network.

FIG. 1 shows an electronic communication network 10 for transmitting information between users and content service provider. User 12 operating with a cellular telephone is connected to electronic communication network 14 by way of communication channel or link 16. Likewise, user 18 operating with a computer is connected to electronic communication network 14 by way of communication channel or link 20, and user 22 operating with another electronic device is connected to electronic communication network 14 by way of communication channel or link 24. The electronic communication network 14 is a distributed network of interconnected routers, gateways, switches, and servers, each with a unique address to enable communication between individual computers, cellular telephones, electronic devices, or nodes within the network. In one embodiment, electronic communication network 14 is a global, open-architecture network, commonly known as the Internet. Alternatively, electronic communication network 14 is a wireless telephone network. Communication channels 16, 20, and 24 are bi-directional and transmit data between users 12, 18, and 22 and electronic communication network 14 in a hard-wired or wireless configuration. For example, user 12 can have a cellular phone with email, texting, and Internet capability, user 18 can operate a computer with email, texting, and Internet capability, and user 22 has another wired or wireless electronic device with email, texting, and Internet capability.

The electronic communication network 10 further includes content service provider 26 in electronic communication with network 14 over communication channel or link 28. Communication channel 28 is bi-directional and transmits data between content service provider 26 and electronic communication network 14 in a hard-wired or wireless configuration. Content service provider 26 retrieves relevant information from one or more content specific databases in response to query from the user.

Figure 2:
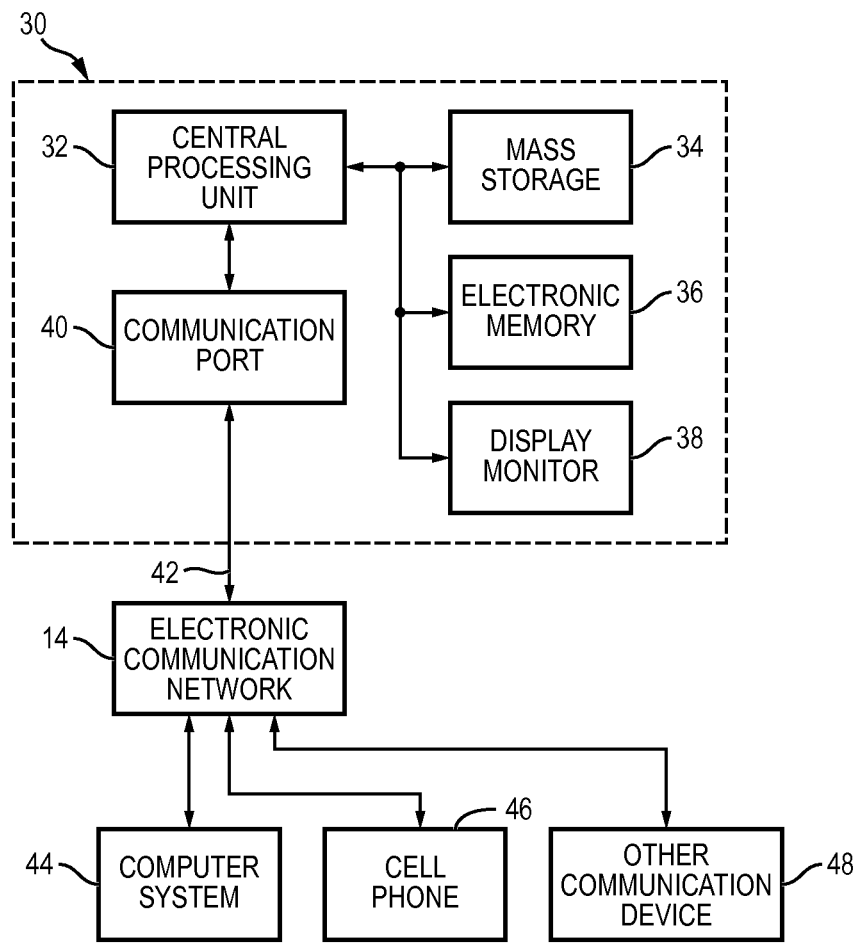
FIG. 2 illustrates further detail of a computer system for use with the electronic communication network.

Further detail of the computer systems used in electronic communication network 10 is shown in FIG. 2 as a simplified computer system 30 for executing the software program used in the electronic communication process. Computer system 30 is a general purpose computer including a central processing unit or microprocessor 32, mass storage device or hard disk 34, electronic memory 36, display monitor 38, and communication port 40. Communication port 40 represents a modem, high-speed Ethernet link, wireless, or other electronic connection to transmit and receive input/output (I/O) data over communication link 42 to electronic communication network 14. Computer system or server 44 can be configured as shown for computer 30. Computer system 44 and cellular telephone 46 transmit and receives information and data over communication network 14. Other electronic devices 48 can also transmit and receive information and data over communication network 14.

Computer systems 30 and 44 can be physically located in any location with access to a modem or communication link to network 14. For example, computer 30 or 44 can be located in the user's home or business office. Alternatively, computer 30 or 44 can be mobile and follow the user to any convenient location, e.g., remote offices, customer locations, hotel rooms, residences, vehicles, public places, or other locales with electronic access to electronic communication network 14. Content service provider 26 may use computer system 30 or 44 in its business office.

Each of the computers runs application software and computer programs, which can be used to display user interface screens, execute the functionality, and provide the electronic communication features as described below. The application software includes a local email application, Internet browser, word processor, spreadsheet, and the like. In one embodiment, the screens and functionality come from the application software, i.e., the electronic communication runs directly on computer system 30. Alternatively, the screens and functions are provided remotely from one or more websites on servers within electronic communication network 14.

The software is originally provided on computer readable media, such as compact disks (CDs), external drive, or other mass storage medium. Alternatively, the software is downloaded from electronic links, such as the host or vendor website. The software is installed onto the computer system hard drive 34 and/or electronic memory 36, and is accessed and controlled by the computer's operating system. Software updates are also electronically available on mass storage medium or downloadable from the host or vendor website.

The software, as provided on the computer readable media or downloaded from electronic links, represents a computer program product containing computer readable program code embodied in a computer program medium.

The electronic communication network 10 can be used for a variety of business, commercial, personal, educational, and government purposes or functions. The user makes a query to content service provider 26. The content service provider searches its content specific databases and returns relevant information based on the query to the user. For example, user 12 using cellular telephone 46 can communicate with content service provider 26 operating on computer 30, and user 18 using computer 44 can communicate with content service provider 26 operating on computer 30. The electronic communication network 10 is an integral part of a business, commercial, professional, educational, government, or social network involving the interaction of people, processes, and commerce.

Figure 3:
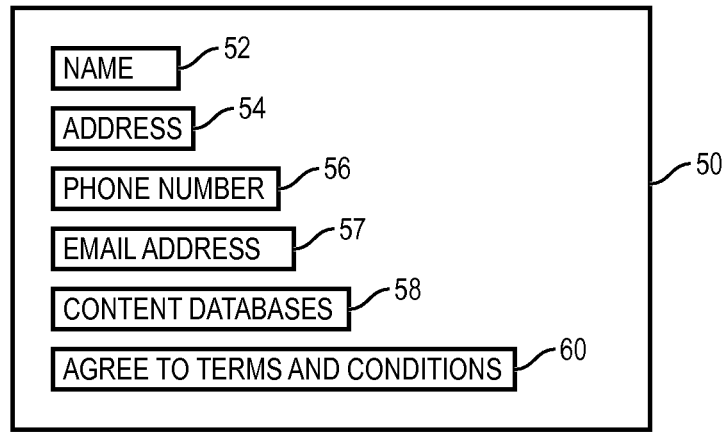
FIG. 3 is a webpage for registering with a content service provider.

The user first creates an account and profile with content service provider 26. The account set-up involves a registration process wherein the user accesses website 50 operated by content service provider 26 and provides data to complete the registration and activation process, as shown in FIG. 3. The user can access website 50 by computer 44 or cellular telephone 46 by typing the uniform resource locator (URL) for website 50, or by clicking on a banner located on another website which re-directs the user to predetermined landing pages for website 50. The data provided by the user to content service provider 26 may include name in block 52, address in block 54, phone number in block 56, email address in block 57, content specific database of interest in block 58, and other information and credentials necessary to establish a profile and identity for the user. Content server provider 26 maintains a number of specific databases that the user subscribes to access, either individually or in combination. For example, the content specific database may be linked to occupational topics, financial markets, social networking, political organizations, music, entertainment, horoscopes, games, food, news, weather, literature, coupons, or other special interests, just to name a few. The user profile can also contain employer, occupation, financial data, interests, associations, religion, marital status, medical conditions, and the like. Other useful information can be extracted from the source banner which directed the user to website 50 originally, e.g., the user was browsing a rhythm and blues music website when selecting the banner for website 50. The user can elect to join one or more user groups with other users with similar interests or demographics. The user may, of course, elect not to provide certain information, which may affect authorization status and ability to receive communications from content service provider 26. The user agrees to the terms and conditions of conducting electronic communication through content service provider 26 in block 60.

Figure 4:
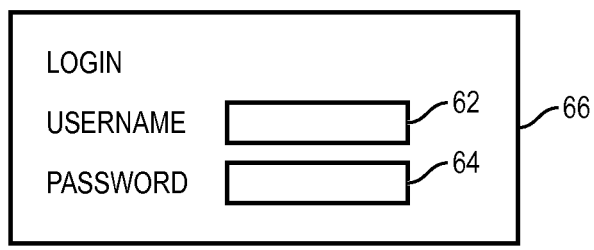
FIG. 4 is a webpage for logging into the content service provider.

Content service provider 26 can use a double opt-in sequence for additional validation and security. Once the user agrees to the terms and conditions, a pin number or validation code is sent as a text message to the phone number provided in block 56 or email address provided in block 57. The user confirms the registration by transmitting the validation code back to content service provider 26. Once validated, the user's profile is stored and maintained with content service provider 26. Within content service provider 26, the user is primarily identified by his or her phone number. The phone number uniquely identifies the user and can be used for communications and billing purposes. The user can access and update his profile by entering username 62 and password 64 in login screen 66, as shown in FIG. 4. The user name can be the phone number or email address and the password assigned to or selected by the user. The user can subscribe and unsubscribe to content specific databases, change personal information, and otherwise update the profile. Accordingly, the user's profile remains secure and confidential within content service provider 26.

Figure 5:
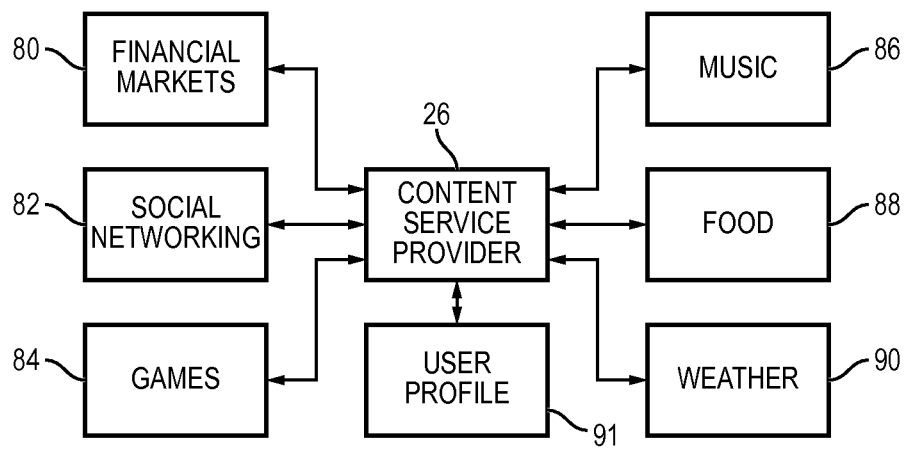
FIG. 5 illustrates content specific databases linked to the content service provider.

FIG. 5 shows content specific database 80 oriented to financial markets, content specific database 82 oriented to social networking, content specific database 84 oriented to games, content specific database 86 oriented to music, content specific database 88 oriented to food, and content specific database 90 oriented to weather, each linked to content service provider 26. Content specific databases 80-90 can each be assigned a short code to uniquely identify one content specific database to simplify SMS texting.

Content specific databases 80-90 are each compiled from a variety of public and private data sources to integrate and correlate information dedicated to a specific topic or category of interest to the user. For example, content specific database 80 is compiled by regularly reviewing a number of publically available Internet websites directed to financial markets, as well as other public and private data sources related to financial information, and organizing the information in a format that is conducive and optimized to respond to user queries. Content service provider 26 organizes content specific database 80 for the purpose of efficiently and systematically responding to a user query with relevant information, as described below. Content specific database 80 is further organized and updated based on historical user queries, user profiles, user groups, aggregation data, and other user input. Temporally popular topics are given priority in the search algorithm. If most historical user queries are directed to consumer interest rates, or the user has expressed interest in consumer interest rates in his or her user profile, then a user query to "current rates" will return matches corresponding to the consumer interest rates sub-topic of financial markets with higher priority and relevance than say, bond discount rates. Content service provider 26 continuously reviews user profiles, learns from historical user queries, updates database contents, and adjusts the search algorithm to improve its ability to respond to user queries with relevant information.

As another example, content specific database 86 is compiled by regularly reviewing a number of publically available Internet websites directed to music, as well as other public and private data sources related to music, and organizing the information in a format conducive and optimized to respond to user queries. Content service provider 26 organizes content specific database 86 for the purpose of efficiently and systematically responding to a user query with relevant information, as described below. Content specific database 86 is further organized and updated based on historical user queries, user profiles, user groups, aggregation data, and other user input. Temporally popular topics are given priority in the search algorithm. If most historical user queries are directed to performing artists, or the user has expressed interest in performing artists in his or her user profile, then a user query to "ice tea" will return matches corresponding to the performing artists sub-topic of music, e.g., popular rapper "Ice T", with higher priority and relevance than say, song lyrics that mention the drink ice tea. Content service provider 26 continuously reviews user profiles, learns from historical user queries, updates database contents, and adjusts the search algorithm to improve its ability to respond to user queries with relevant information.

As yet another example, content specific database 88 is compiled by regularly reviewing a number of publically available Internet websites directed to food, as well as other public and private data sources related to food, and organizing the information in a format conducive and optimized to respond to user queries. Content service provider 26 organizes content specific database 80 for the purpose of efficiently and systematically responding to a user query with relevant information, as described below. Content specific database 88 is further organized and updated based on historical user queries, user profiles, user groups, aggregation data, and other user input. Temporally popular topics are given priority in the search algorithm. If most historical user queries are directed to recipes, or the user has expressed interest in food recipes in his or her user profile, then a user query to "beef" will return matches corresponding to the recipes sub-topic of food with higher priority and relevance than say, health concerns about beef. Content service provider 26 continuously reviews user profiles, learns from historical user queries, updates database contents, and adjusts the search algorithm to improve its ability to respond to user queries with relevant information. Content specific databases 82, 84, and 90 are compiled in a similar manner.

Figure 6:
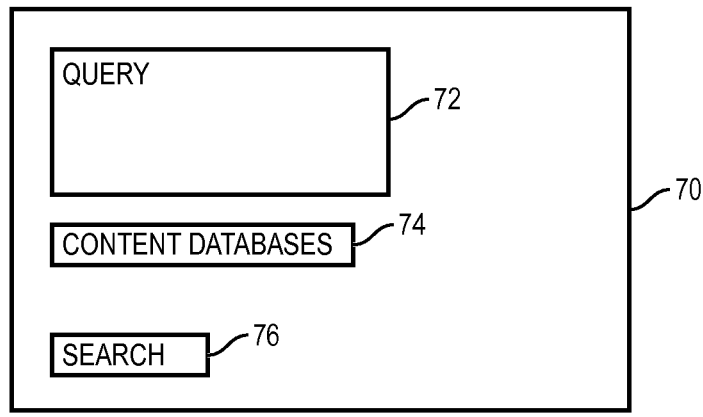
FIG. 6 is a webpage for making a first level user query to the content specific database.

Consider an example where the user wants to make a query to content service provider 26. If operating from computer 44, the user logs in with user name and password. A query composition webpage or window 70 is presented for the user on computer 44, such as shown in FIG. 6. The user composes the first level query in block 72 and selects one or more content specific databases or vertical subjects to be searched in block 74 based on the stated query from block 72. The query typically contains text, but may also contain figures, pictures, video, and any other data content used on the Internet. In this case, the query is "beef" and the vertical subject is "food" in content specific database 88. The user can also identify one or more specific content specific databases to exclude from the search. When the user clicks search or send button 76, the query with selected content specific database is transmitted to content service provider 26 for search and response with information relevant to the first level query.

Figure 7:
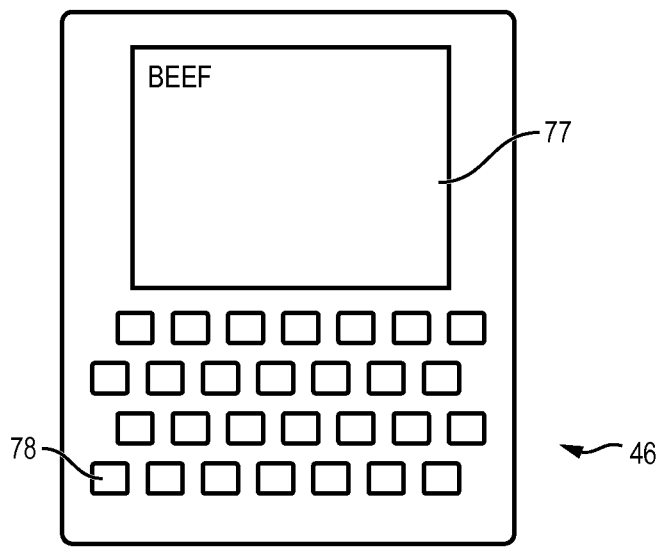
FIG. 7 illustrates a cellular telephone for making a first level user query into a content specific database.

If operating from cellular telephone 46, the user is identified by the embedded cell phone number. The first level query is transmitted to content service provider 26 as short message service (SMS) text. Each content specific database maintained by content service provider 26 can be assigned a short code, i.e., numeric address or identifier, for ease of typing and space efficiency (SMS text limited to 160 characters). The user texts "beef" to short code 77888 on cellular telephone 46 to query "beef" for the vertical subject of "food" in content specific database 88 to content service provider 26. FIG. 7 shows cellular telephone 46 with the query embodied in SMS text presented on cell phone display 77 to be transmitted to content service provider 26. Short code 77888 is an address to content database 88 containing the vertical subject "food."

The first level query is received by content service provider 26 on computer system 30 through direct communication or through an application programming interface (API). The query contains at least the user's phone number and search text or keywords entered in block 72 or as SMS text. The phone number is derived from the user login if operating from computer 44, or from the identifier of cellular telephone 46 if the query is transmitted through electronic communication network 10 by SMS text. The query may also contain or identify a selected content specific database. Texting the first level query "beef" to short code 77888 designates content specific database 88 by the short code number. If the query does not include a selected content specific database, then the user profile is accessed to determine which content specific database(s) the user has subscribed to during registration or updated at a later time.

Content service provider 26 conducts a search within the selected content specific database. A search criteria is formulated with focus on the specific query transmitted by the user and selected content specific database. In the present case, the keyword "beef" is linked to the vertical subject "food" in content specific database 88, based on query composition window 70 from computer 44 or the keyword and short code from cellular telephone 46. Content service provider 26 also accesses the user profile in compiling the search criteria. For example, content service provider 26 may also have information, based on user profile 91, that the user is an amateur chef and knowledgeable about specialized food preparation or, conversely, that the user has limited cooking skills and prefers simple recipes. The user profile may also specify certain food preferences or food avoidances based on taste palate, health habits, religious beliefs, or medical conditions such as diabetes, high cholesterol or food allergy.

The search of content specific database 88 using the search criteria returns one or more matches to the user query. Each match is assigned a relevance score based on correspondence to the first level query and user profile 91. The relevance score can range from 0 (minimal or no relevance) to 1 (highest relevance). The relevance is computed by analyzing the closeness of the match in character-by-character comparison between the keyword and database entry, as well as values stored in the database corresponding to the preferences contained in the user profile. The closer the match in the character-by-character comparison, the higher the relevance score. The keyword and database entry comparison also takes into account partial words, abbreviations, acronyms, synonyms, and word equivalents. For example, "beef" is equated to "red meat", "angus", or "steak." A stored value indicating a complex recipe preparation lowers the relevance score for the user wanting simple dishes. A stored value indicating low sugar content of the ingredients for the recipe increases the relevance score for a person with diabetes.

Figure 8:
FIG. 8 illustrates a menu of search results from the first level user query into the content specific database.

The number of matches is in part related to the specificity of the keyword(s) in the first level query. A more generic keyword returns more matches; a more specific keyword or group of words returns fewer matches. The matches are prioritized by the relevance score, grouped in a menu, and returned to the user. The menu entries can be text and/or graphical images representative of the match found in the content specific database. FIG. 8 shows menu 92 with relevant search results returned to the user and displayed on cellular telephone 46. Each entry in menu 92 is assigned a reference number. For the keyword "beef" searched in the vertical subject "food" of content specific database 88, the corresponding menu entries as determined by the search algorithm are "beef appetizers" assigned reference number 1, "beef entrees" assigned reference number 2, and "beef international recipes" assigned reference number 3. While menu 92 is shown with three entries for simplicity in presentation, the menu typically has many more entries. The number of entries in the menu is dependent on the display area available to the user. Cellular telephone 46 has significantly less display area than computer 44.

The user receives menu 92 from content service provider 26 for display on cellular telephone 46. The user can select one of the menu entries in menu 92 for additional, refined searching. In this case, the user selects "beef international recipes" and texts "3" (for reference number 3) to short code 77888. Content service provider 26 receives the text from the user.

Content service provider 26 recognizes the text "3" received from the user as a second level query, because of the recent first level query for "beef." A new first level query can be distinguished from a second level query as the first level query contains a new keyword, whereas a second level query contains a reference number. In the second level query, content service provider 26 conducts another search within content specific database 88 for the selected reference number, i.e., reference number 3 for "beef international recipes." As described in the first level search, content service provider 26 also accesses the user profile in compiling the search criteria and running the search algorithm.

Figure 9:
FIG. 9 illustrates a menu of search results from a second level user query into the content specific database.

The search of content specific database 88 using the second level query returns one or more matches. Each match is assigned a relevance score, similar to the first level search. The matches are prioritized by the relevance score, grouped in a menu, and returned to the user. The menu entries can be text and/or graphical images representative of the match found in the content specific database. FIG. 9 shows menu 94 with relevant search results returned to the user and displayed on cellular telephone 46. Each entry in menu 94 is assigned a reference number. For the second level query "beef international recipes" searched in the vertical subject "food" of content specific database 88, the corresponding menu entries as determined by the search algorithm are "Mexico" assigned reference number 1, "Italian" assigned reference number 2, and "Greek" assigned reference number 3.

The user receives menu 94 from content service provider 26 for display on cellular telephone 46. The user can select one of the menu entries in menu 94 for additional, refined searching. In this case, the user selects "Italian" and texts "2" (for reference number 2) to short code 77888. Content service provider 26 receives the text from the user.

Content service provider 26 recognizes the text "2" received from the user as a third level query, because of the recent first level and second level queries related to "beef" and "beef international recipes." In the third level query, content service provider 26 conducts another search within content specific database 88 for the selected reference number, i.e., reference number 2 for "Italian." As described in the first level search, content service provider 26 also accesses the user profile in compiling the search criteria and running the search algorithm.

Figure 10:
FIG. 10 illustrates a menu of search results from a third level user query into the content specific database.

The search of content specific database 88 using the third level query returns one or more matches. Each match is assigned a relevance score, similar to the first level search. The matches are prioritized by the relevance score, grouped in a menu, and returned to the user. The menu entries can be text and/or graphical images representative of the match found in the content specific database. FIG. 10 shows menu 96 with relevant search results returned to the user and displayed on cellular telephone 46. Each entry in menu 96 is assigned a reference number. For the third level query "Italian" searched in the vertical subject "food" of content specific database 88, the corresponding menu entries as determined by the search algorithm are "Italian style meatloaf" assigned reference number 1, "Capraccio" assigned reference number 2, and "Braciola Di Manzo" assigned reference number 3.

The user receives menu 96 from content service provider 26 for display on cellular telephone 46. The user can select one of the menu entries in menu 96 for additional, refined searching. In this case, the user selects "Italian style meatloaf" and texts "1" (for reference number 1) to short code 77888. Content service provider 26 receives the text from the user.

Content service provider 26 recognizes the text "1" received from the user as a fourth level query, because of the recent first level, second level, and third level queries related to "beef", "beef international recipes", and "Italian." In the fourth level query, content service provider 26 conducts another search within content specific database 88 for the selected reference number, i.e., reference number 1 for "Italian style meatloaf." As described in the first level search, content service provider 26 also accesses the user profile in compiling the search criteria and running the search algorithm.

Figure 11:
FIG. 11 illustrates a menu of search results from a fourth level user query into the content specific database.

The search of content specific database 88 using the fourth level query returns one or more matches. Each match is assigned a relevance score, similar to the first level search. The matches are prioritized by the relevance score, grouped in a menu, and returned to the user. The menu entries can be text and/or graphical images representative of the match found in the content specific database. FIG. 11 shows menu 98 with relevant search results returned to the user and displayed on cellular telephone 46. Each entry in menu 98 is assigned a reference number. For the fourth level query "Italian style meatloaf" searched in the vertical subject "food" of content specific database 88, the corresponding menu entries as determined by the search algorithm are the ingredients "1 pound ground beef" assigned reference number 1, "1 diced onion" assigned reference number 2, "2 teaspoons garlic" assigned reference number 3, "2 tablespoons extra-virgin olive oil" assigned reference number 4, "1 seeded and diced red pepper" assigned reference number 5, and "2 eggs" assigned reference number 6. Menu 98 contains more entries for the ingredients of "Italian style meatloaf." The user can text "m" to short code 77888 for more entries in the present menu.

The user receives menu 98 from content service provider 26 for display on cellular telephone 46. The systematic process of query, search, review, and further selection of menu entries continues until the user has the needed information. At any level query, the user can text "n" for next level query or "b" for back in previous level query. The search results are stored with content service provider 26 for a period of time to allow the user to continue the search sequence at a later time.

Figure 12:
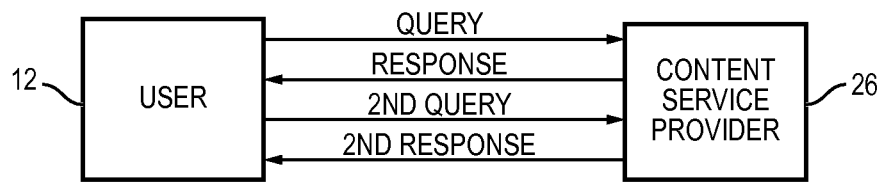
FIG. 12 illustrates the user and content service provider controlling the electronic communication network by sending queries and receiving responses.

Content service provider 26 exercises control over electronic communication network 10 by providing interactive communication between the users and content specific databases 80-90, as shown in FIG. 12. For example, the user makes a first level query by SMS texting a keyword using a short code to content service provider 26. Content service provider 26 conducts a search based on the first level query, as well as the user profile, in the selected content specific database and returns a response organized in a menu format by relevance of the search results of the first level query. If the user wants to drill down further into a particular entry in the menu, he or she makes a second level query by SMS texting the reference number for the selected entry to the short code associated with the selected content specific database. Content service provider 26 conducts a search based on the second level query, as well as the user profile, in the content specific database and returns a response organized in a menu format by relevance of the search results for the second level query. The systematic process of query, search, review, and further selection of menu entries continues until the user has the needed information. Accordingly, content service provider 26 controls interactive communication services which are organized to efficiently and systematically respond to user queries, for example using SMS texting, with relevant information from content specific databases.

Consider another example where the user wants to make a query to content service provider 26. In this case, the user texts "mesa" to short code 88999 on cellular telephone 46 for the vertical subject of "weather" in content specific database 90. Content service provider 26 conducts a search for the first level query "mesa" within content specific database 90. Content service provider 26 also accesses the user profile in compiling the search criteria and running the search algorithm. For example, "mesa" could be the user's home address.

Figure 13:
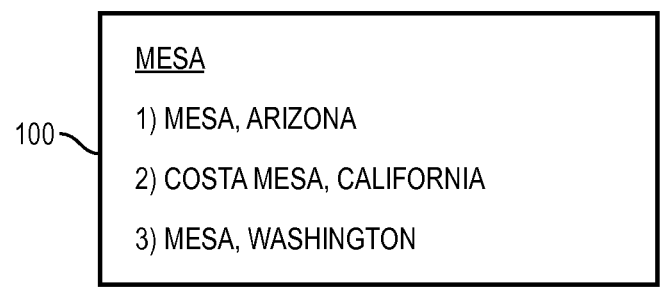
FIG. 13 illustrates a menu of search results from another first level user query into the content specific database.

The search of content specific database 90 using the first level query returns one or more matches. Each match is assigned a relevance score. The matches are prioritized by the relevance score, grouped in a menu, and returned to the user. The menu entries can be text and/or graphical images representative of the match found in the content specific database. FIG. 13 shows menu 100 with relevant search results returned to the user and displayed on cellular telephone 46. Each entry in menu 100 is assigned a reference number. For the first level query "mesa" searched in the vertical subject "weather" of content specific database 90, the corresponding menu entries as determined by the search algorithm are "Mesa, Ariz." assigned reference number 1, "Costa Mesa, Calif." assigned reference number 2, and "Mesa, Wash." assigned reference number 3.

The user receives menu 100 from content service provider 26 for display on cellular telephone 46. The user can select one of the menu entries in menu 100 for additional, refined searching. In this case, the user selects "Costa Mesa, Calif." and texts "2" (for reference number 2) to short code 88999. Content service provider 26 receives the text from the user.

Content service provider 26 recognizes the text "2" received from the user as a second level query, because of the recent first level query related to "mesa." In the second level query, content service provider 26 conducts another search within content specific database 90 for the selected reference number, i.e., reference number 2 for "Costa Mesa, Calif." As described in the first level search, content service provider 26 also accesses the user profile in compiling the search criteria and running the search algorithm.

Figure 14:
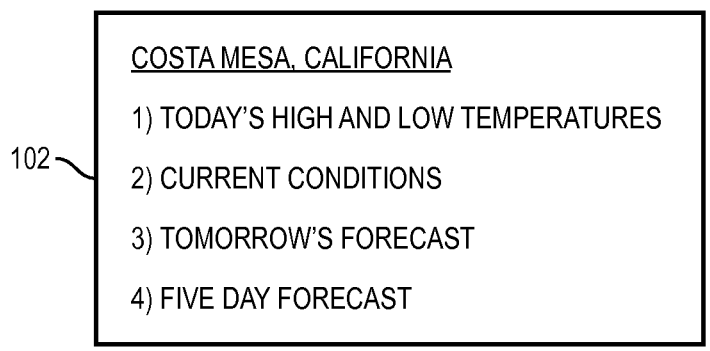
FIG. 14 illustrates a menu of search results from a second level user query into the content specific database.

The search of content specific database 90 using the second level query returns one or more matches. Each match is assigned a relevance score, similar to the first level search. The matches are prioritized by the relevance score, grouped in a menu, and returned to the user. The menu entries can be text and/or graphical images representative of the match found in the content specific database. FIG. 14 shows menu 102 with relevant search results returned to the user and displayed on cellular telephone 46. Each entry in menu 102 is assigned a reference number. For the second level query "Costa Mesa, Calif." searched in the vertical subject "weather" of content specific database 90, the corresponding menu entries as determined by the search algorithm are "Today's high and low temperatures" assigned reference number 1, "Current conditions" assigned reference number 2, "Tomorrow's forecast" assigned reference number 3, and "Five day forecast" assigned reference number 4.

The user receives menu 102 from content service provider 26 for display on cellular telephone 46. The user can select one of the menu entries in menu 102 for additional, refined searching. In this case, the user selects "Tomorrow's forecast" and texts "3" (for reference number 3) to short code 88999. Content service provider 26 receives the text from the user.

Content service provider 26 recognizes the text "3" received from the user as a third level query, because of the recent first level and second level queries related to "mesa." In the third level query, content service provider 26 conducts another search within content specific database 90 for the selected reference number, i.e., reference number 3 for "Tomorrow's forecasts." As described in the first level search, content service provider 26 also accesses the user profile in compiling the search criteria and running the search algorithm.

Figure 15:
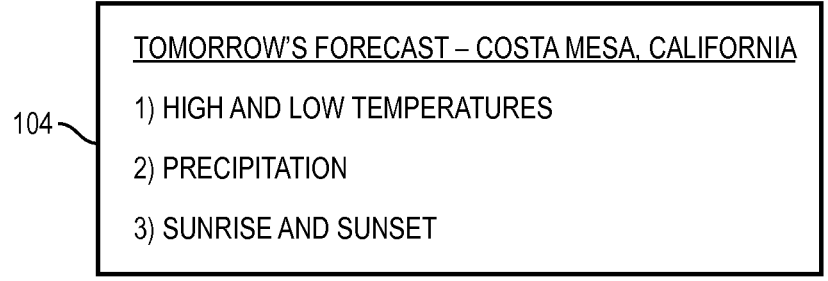
FIG. 15 illustrates a menu of search results from a third level user query into the content specific database.

The search of content specific database 90 using the third level query returns one or more matches. Each match is assigned a relevance score, similar to the first level search. The matches are prioritized by the relevance score, grouped in a menu, and returned to the user. The menu entries can be text and/or graphical images representative of the match found in the content specific database. FIG. 15 shows menu 104 with relevant search results returned to the user and displayed on cellular telephone 46. Each entry in menu 104 is assigned a reference number. For the third level query "Tomorrow's forecasts" searched in the vertical subject "weather" of content specific database 90, the corresponding menu entries as determined by the search algorithm are "High and low temperatures" assigned reference number 1, "Precipitation" assigned reference number 2, and "Sunrise and sunset" assigned reference number 3.

The user receives menu 98 from content service provider 26 for display on cellular telephone 46. The systematic process of query, search, review, and further selection of menu entries continues until the user has the needed information. At any level query, the user can text "n" for next recipe, "m" for more entries, "b" for back in level query. Thus, the user can move between menus as need. The interactive communication service is organized to efficiently and systematically respond to user queries with relevant information from the content specific databases.

In another embodiment, the user texts "gta4" to short code 88777 on cellular telephone 46 for the vertical subject of "games" in content specific database 84. Content service provider 26 performs an acronym look-up for "gta4" within content specific database 84. The keyword "gta4" corresponds to the game "Grand Theft Auto IV." Content service provider 26 conducts a search for the first level query "Grand Theft Auto IV" within content specific database 84. Content service provider 26 also accesses the user profile in compiling the search criteria and running the search algorithm.

Figure 16:
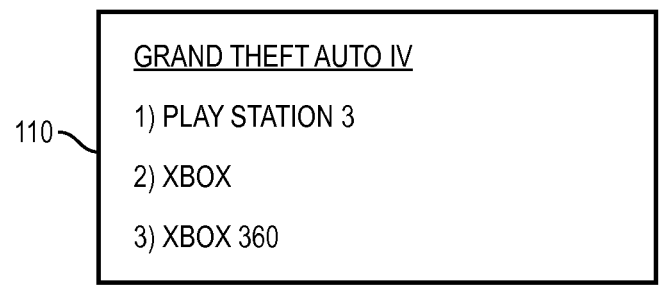
FIG. 16 illustrates a menu of search results from another first level user query into the content specific database.

The search of content specific database 84 using the first level query returns one or more matches. Each match is assigned a relevance score. The matches are prioritized by the relevance score, grouped in a menu, and returned to the user. The menu entries can be text and/or graphical images representative of the match found in the content specific database. FIG. 16 shows menu 110 with relevant search results returned to the user and displayed on cellular telephone 46. Each entry in menu 110 is assigned a reference number. For the first level query "Grand Theft Auto IV" searched in the vertical subject "games" of content specific database 84, the corresponding menu entries as determined by the search algorithm are "Play Station 3" assigned reference number 1, "XBox" assigned reference number 2, and "Xbox 360" assigned reference number 3.

The user receives menu 110 from content service provider 26 for display on cellular telephone 46. The user can select one of the menu entries in menu 110 for additional, refined searching. In this case, the user selects "Play Station 3" and texts "1" (for reference number 1) to short code 88777. Content service provider 26 receives the text from the user.

Content service provider 26 recognizes the text "1" received from the user as a second level query, because of the recent first level query related to "Grand Theft Auto IV." In the second level query, content service provider 26 conducts another search within content specific database 84 for the selected reference number, i.e., reference number 1 for "Play Station 3." As described in the first level search, content service provider 26 also accesses the user profile in compiling the search criteria and running the search algorithm.

Figure 17:
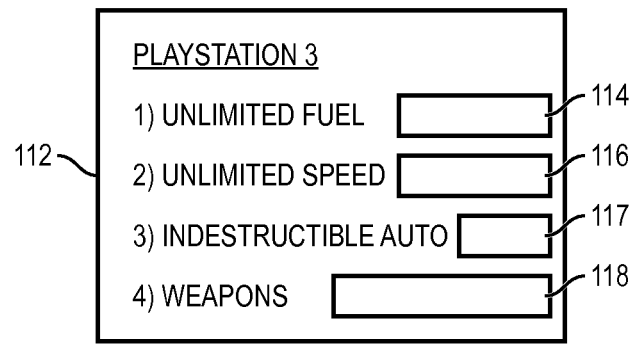
FIG. 17 illustrates a menu of search results from a second level user query into the content specific database.

The search of content specific database 84 using the second level query returns one or more matches. Each match is assigned a relevance score, similar to the first level search. The matches are prioritized by the relevance score, grouped in a menu, and returned to the user. The menu entries can be text and/or graphical images representative of the match found in the content specific database. FIG. 17 shows menu 112 with relevant search results returned to the user and displayed on cellular telephone 46. Each entry in menu 112 is assigned a reference number. For the second level query "Play Station 3" searched in the vertical subject "games" of content specific database 84, the corresponding menu entries as determined by the search algorithm are "Unlimited fuel" with graphical image 114 assigned reference number 1, "Unlimited speed" with graphical image 116 assigned reference number 2, "Indestructible auto" with graphical image 117 assigned reference number 3, and "Weapons" with graphical image 118 assigned reference number 4.

The user receives menu 112 from content service provider 26 for display on cellular telephone 46. The user can select one of the menu entries in menu 112 for additional, refined searching. The systematic process of query, search, review, and further selection of menu entries continues until the user has the needed information. At any level query, the user can text "n" for next entry, "m" for more entries, or "b" for back in level query.

The user can set preferences with user profile 91, or as part of the first level search criteria, to respond with search results from the content specific database at regular intervals or at specific later times, particularly for information that frequently changes. For example, the user may want regular weather updates during adverse conditions, financial market updates, or social networking updates. The user can request aggregate information based on popular topics or requests from other users within the user group or with similar interests from the content specific databases, e.g., updates from the gaming community. Content service provider 26 automatically texts the user with relevant updates as set by the preferences. The interactive communication service is organized to efficiently and systematically respond to user queries with relevant information from content specific databases.

Figure 18:
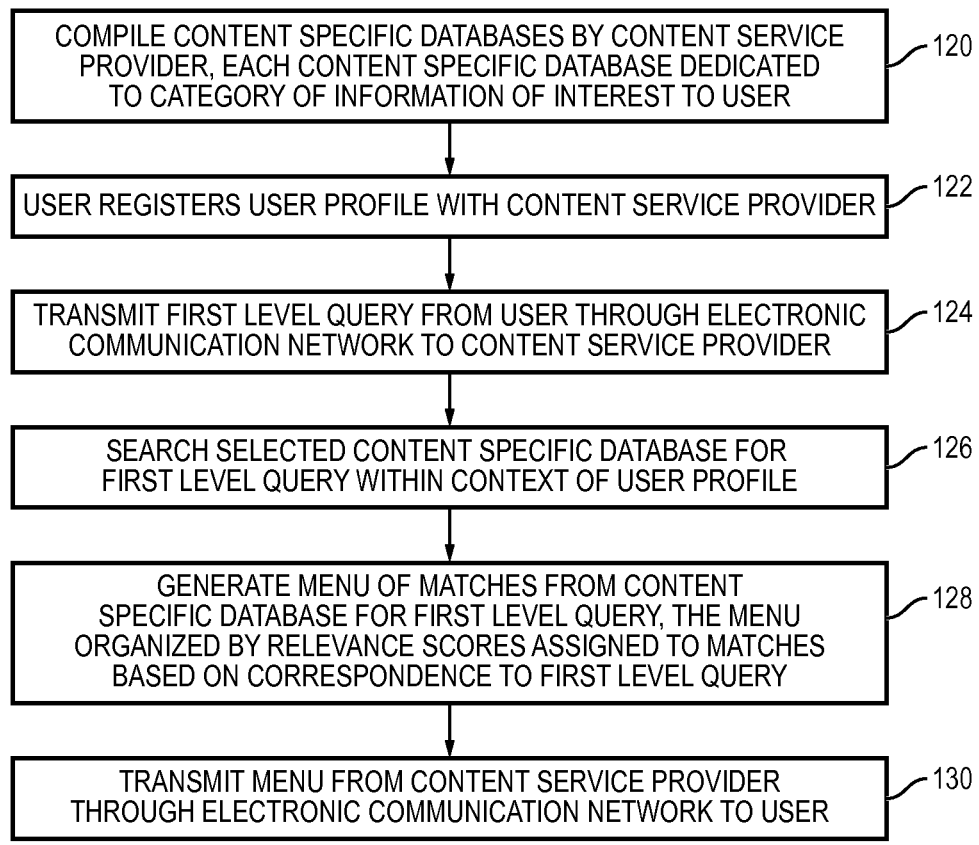
FIG. 18 is a flowchart of a process of controlling the electronic communication network by sending queries and receiving responses.

FIG. 18 is a flowchart of a method of controlling access to a plurality of content specific databases through an electronic communication network. In step 120, a plurality of content specific databases is compiled by a content service provider, each content specific database dedicated to a category of information of interest to a user. In step 122, the user registers a user profile with the content service provider. In steps 124, a first level query is transmitted from a cellular telephone or computer operated by the user through the electronic communication network to the content service provider. The first level query can be transmitted as SMS text. The first level query includes a selected content specific database. The content specific database is selected by SMS texting the first level query to a unique short code. In step 126, the selected content specific database is searched for the first level query within context of the user profile. In step 128, a first menu of matches is generated from the content specific database for the first level query. The first menu is organized by relevance scores assigned to the matches based on correspondence to the first level query. In step 130, the first menu is transmitted from the content service provider through the electronic communication network to the user. The first menu is transmitted back to the originating cellular telephone or computer. A second level query is transmitted from the user to the content service provider. The second level query is an entry from the first menu as selected by the user. The selected content specific database is searched for the second query. A second menu of matches is generated from the content specific database for the second level query. The second menu is organized by relevance scores assigned to the matches. The second menu is transmitted from the content service provider through the electronic communication network to the user.

Figure 19:
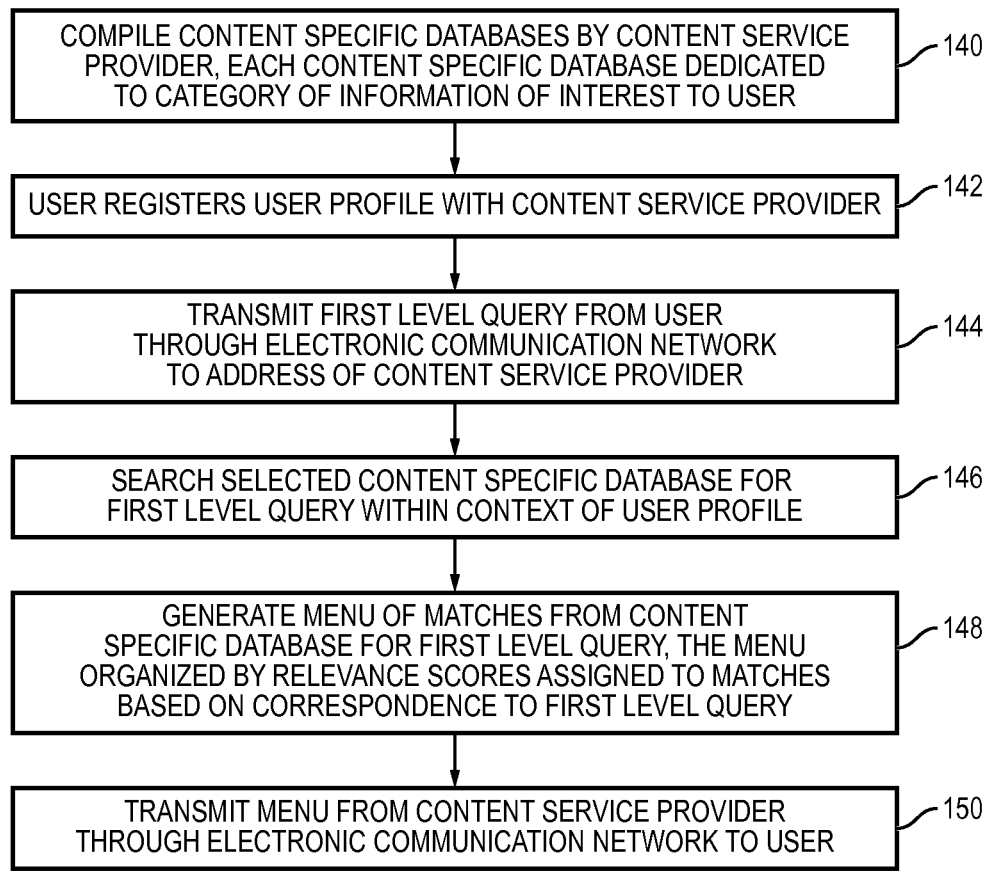
FIG. 19 is a flowchart of another process of controlling the electronic communication network by sending queries and receiving responses.

FIG. 19 is another flowchart of controlling access to a plurality of content specific databases through an electronic communication network. In step 140, a plurality of content specific databases is compiled by a content service provider, each content specific database is dedicated to a category of information of interest to the user. In step 142, the user registers a user profile with the content service provider. In step 144, a first level query is transmitted from a cellular telephone or computer operated by the user through the electronic communication network to an address of the content service provider. The first level query can be transmitted as SMS text. The address selects one of the plurality of content specific databases. The content specific database is selected by SMS texting the first level query to a unique short code. In step 146, the selected content specific database is searched for the first level query within context of the user profile. In step 148, a first menu of matches is generated from the content specific database for the first level query. The first menu is organized by relevance scores assigned to the matches based on correspondence to the first level query. The first menu can include graphic images. In step 150, the first menu is transmitted from the content service provider through the electronic communication network to the user. The first menu is transmitted back to the originating cellular telephone or computer. A second level query is transmitted from the user to the content service provider. The second level query is an entry from the first menu as selected by the user. The selected content specific database is searched for the second query. A second menu of matches is generated from the content specific database for the second level query. The second menu is organized by relevance scores assigned to the matches. The second menu is transmitted from the content service provider through the electronic communication network to the user.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of controlling access to a plurality of content specific databases through an electronic communication network, comprising:
   compiling the plurality of content specific databases with each content specific database dedicated to a category of information;
   transmitting a first level query from an electronic device of a user to a content service provider as a short message service (SMS) text message;
   selecting a first content specific database from the plurality of content specific databases based on a numeric address of the SMS text message;
   searching the first content specific database for the first level query;
   generating a first menu of matches from the first content specific database with the first menu of matches selectable by the user as additional search terms for refined searching of the first content specific database;
   transmitting the first menu of matches from the content service provider through the electronic communication network to the electronic device of the user;

transmitting a second level query from the user to the content service provider, the second level query being an entry from the first menu as selected by the user;
searching the first content specific database for the second level query in combination with the first level query;
generating a second menu of matches from the first content specific database for the second level query; and
transmitting the second menu from the content service provider through the electronic communication network to the user.

2. The method of claim 1, further including:
transmitting the first level query from a cellular telephone or computer operated by the user; and
transmitting the first menu to the cellular telephone or computer.

3. The method of claim 1, further including organizing the first menu by relevance scores assigned to the matches based on correspondence to the first level query.

4. A method of controlling access to a plurality of content specific databases through an electronic communication network, comprising:
compiling the plurality of content specific databases;
transmitting a first level query from a user through the electronic communication network to a content service provider as a short message service (SMS) text message;
selecting a first content specific database using an address of the SMS text message;
searching the first content specific database for the first level query;
generating a first menu of matches from the first content specific database with the first menu of matches including sub-topics of the first level query selectable for additional searching of the first content specific database;
transmitting the first menu of matches from the content service provider through the electronic communication network to the user;
transmitting a second level query from the user to the content service provider, the second level query being an entry from the first menu selected by the user;
searching the first content specific database for the second level query;
generating a second menu of matches from the first content specific database for the second level query; and
transmitting the second menu from the content service provider through the electronic communication network to the user.

5. The method of claim 4, further including organizing the first menu by relevance scores assigned to the matches based on correspondence to the first level query.

6. The method of claim 4, further including:
transmitting the first level query from a cellular telephone or computer operated by the user; and
transmitting the first menu to the cellular telephone or computer.

7. The method of claim 4, wherein the address of the first level query SMS text message is a unique short code.

8. The method of claim 4, wherein the first menu includes images.

9. A method of controlling access to a plurality of content specific databases through an electronic communication network, comprising:
transmitting a first level query from a user to a content service provider as a short message service (SMS) text message;
selecting a first content specific database that the user previously subscribed to;
searching the first content specific database for the first level query;
generating a first menu of matches from the first content specific database to provide refined searching for the first level query;
transmitting the first menu of matches from the content service provider through the electronic communication network to the user;
transmitting a second level query from the user to the content service provider, the second level query being an entry from the first menu as selected by the user;
searching the first content specific database for the second level query;
generating a second menu of matches from the first content specific database for the second level query; and
transmitting the second menu from the content service provider through the electronic communication network to the user.

10. The method of claim 9, further including compiling the plurality of content specific databases using the content service provider.

11. The method of claim 9, further including registering a user profile with the content service provider.

12. The method of claim 9, further including organizing the first menu by relevance scores assigned to the matches.

13. The method of claim 9, further including:
transmitting the first level query from a cellular telephone or computer operated by the user; and
transmitting the first menu to the cellular telephone or computer.

14. A non-transitory computer readable medium including a computer readable program code to implement a method for controlling access to a plurality of content specific databases through an electronic communication network, comprising:
transmitting a first level query from a user to a content service provider as a short message service (SMS) text message;
selecting a first content specific database based on an address of the SMS text message;
searching the first content specific database for the first level query;
generating a first menu of matches from the first content specific database for the first level query to provide refined additional searching;
transmitting the first menu of matches from the content service provider through the electronic communication network to the user;
allowing the user to request updated search results at a regular interval or specific later time;
transmitting a second level query from the user to the content service provider, the second level query being an entry from the first menu as selected by the user;
searching the first content specific database for the second level query;
generating a second menu of matches from the first content specific database for the second level query; and
transmitting the second menu from the content service provider through the electronic communication network to the user.

15. The non-transitory computer readable medium of claim 14, further including:
transmitting the first level query from a cellular telephone or computer operated by the user; and
transmitting the first menu to the cellular telephone or computer.

16. The non-transitory computer readable medium of claim 14, further including organizing the first menu by relevance scores assigned to the matches.

17. A method of controlling access to a content specific database, comprising:
- executing a first search of the content specific database using a first search query transmitted by a first short message service (SMS) text message to a content service provider hosting the content specific database on a computer system;
- transmitting a plurality of first matches for the first search query from the content specific database by a second SMS text message;
- executing a second search of the content specific database in response to a reference identifier associated with one of the plurality of first matches selected by the user;
- transmitting a plurality of second matches for the first search query refined by the first match associated with the reference identifier; and
- providing a function to return to the plurality of first matches from the plurality of second matches by transmitting an SMS text message.

18. The method of claim 17, further including organizing the plurality of first matches and the plurality of second matches by relevance scores.

19. The method of claim 17, further including:
- transmitting the first search query from a cellular telephone or computer operated by the user; and
- transmitting the plurality of first matches and the plurality of second matches to the cellular telephone or computer of the user.

20. The method of claim 17, further including selecting the content specific database from a plurality of content specific databases by transmitting an SMS text message with an address specific to the content specific database.

* * * * *